United States Patent
Wiley, III

(10) Patent No.: US 10,689,273 B2
(45) Date of Patent: Jun. 23, 2020

(54) CLARIFIER FOR WATER TREATMENT

(71) Applicant: Xylem Water Solutions Zelienople LLC, Zelienople, PA (US)

(72) Inventor: Robert Lee Wiley, III, Pittsburgh, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 2 days.

(21) Appl. No.: 16/059,409

(22) Filed: Aug. 9, 2018

(65) Prior Publication Data

US 2019/0047884 A1 Feb. 14, 2019

Related U.S. Application Data

(60) Provisional application No. 62/543,036, filed on Aug. 9, 2017, provisional application No. 62/598,623, filed on Dec. 14, 2017.

(51) Int. Cl.
*B01D 21/02* (2006.01)
*C02F 1/52* (2006.01)
*B01D 21/24* (2006.01)
*B01D 21/00* (2006.01)
(Continued)

(52) U.S. Cl.
CPC ............ *C02F 1/5281* (2013.01); *B01D 21/00* (2013.01); *B01D 21/0003* (2013.01); *B01D 21/0006* (2013.01); *B01D 21/0015* (2013.01); *B01D 21/0045* (2013.01); *B01D 21/0075* (2013.01); *B01D 21/2416* (2013.01); *B01D 21/2444* (2013.01); *C02F 1/56* (2013.01); *C02F 2001/007* (2013.01); *C02F 2303/22* (2013.01)

(58) Field of Classification Search
CPC ............ B01D 21/0003; B01D 21/0027; B01D 21/0045; B01D 21/0075; B01D 21/2444
USPC ......................................... 210/521, 522, 802
See application file for complete search history.

(56) References Cited

U.S. PATENT DOCUMENTS 4,194,976 A 3/1980 Robinksy
4,290,887 A * 9/1981 Brown ............... B01D 21/2444
210/525
(Continued)

FOREIGN PATENT DOCUMENTS

CN 202173819 U 3/2012
JP 6154514 A 6/1994
(Continued)

OTHER PUBLICATIONS

Translation of KR 101450772, Oct. 2014 (Year: 2014).*

*Primary Examiner* — Christopher Upton
(74) *Attorney, Agent, or Firm* — The Webb Law Firm

(57) ABSTRACT

The present invention is directed to a clarifier for water treatment including a plurality of planar inclined sheets including a flexible polymeric material. Each sheet includes a hydrophobic surface. The present invention is also directed to a clarifier that includes at least one module, each module including: a plurality of vertically-oriented supports and a planar inclined sheet including a flexible polymeric material tensioned between the plurality of vertically-oriented supports. The present invention is also directed to a water collection system of a water treatment system including: a collection trough configured to receive liquid and a buoyant member configured to support the collection trough.

18 Claims, 14 Drawing Sheets

(51) Int. Cl.
  *C02F 1/56*  (2006.01)
  *C02F 1/00*  (2006.01)

(56) References Cited

U.S. PATENT DOCUMENTS

| | | | |
|---|---|---|---|
| 4,305,819 A * | 12/1981 | Kobozev | B01D 21/0027 |
| | | | 210/521 |
| 4,514,303 A * | 4/1985 | Moore | B01D 21/0045 |
| | | | 210/521 |
| 4,933,524 A | 6/1990 | Meurer | |
| 4,957,628 A | 9/1990 | Schulz | |
| 5,338,449 A | 8/1994 | Ichiyanagi et al. | |
| 5,391,306 A | 2/1995 | Meurer | |
| 2007/0075024 A1* | 4/2007 | Campbell | B01D 21/0045 |
| | | | 210/521 |
| 2008/0314823 A1* | 12/2008 | Kulick, III | B01D 21/0045 |
| | | | 210/521 |

FOREIGN PATENT DOCUMENTS

| | | |
|---|---|---|
| KR | 200220281 Y1 | 2/2001 |
| KR | 101288298 B1 | 7/2013 |
| KR | 101450772 * | 10/2014 |
| KR | 101450772 B1 | 10/2014 |
| WO | 8912492 A1 | 12/1989 |

* cited by examiner

CLARIFIER FOR WATER TREATMENT

CROSS REFERENCE TO RELATED APPLICATIONS

This application claims claim priority to U.S. Provisional Patent Application No. 62/543,036, filed Aug. 9, 2017, and U.S. Provisional Patent Application No. 62/598,623, filed Dec. 14, 2017, the disclosures of which are hereby incorporated in their entireties by reference.

BACKGROUND OF THE INVENTION

Field of the Invention

The present invention relates to a clarifier for water treatment, a water treatment system, and a method for treating water (e.g., wastewater, industrial water, source water for potable water). The present invention also relates to a water collection system of a water treatment system and a method of collecting clarified water from a water treatment system.

Description of Related Art

Clarifiers using inclined plates or sheets are used in the clarification process in a water treatment system. Prior to the clarification process, the water is subjected to certain chemistry, such as alum, iron, or polymers in order to coagulate the particles in the water to form an agglomerate of the particles hereafter referred to as floc. The water with the suspended floc then travels up through the plates or sheets and via sedimentation the floc particles accumulate on plates or sheets due to gravity, leaving clarified water to proceed to the top of the system.

In operation, floc can begin to form a thick layer on the plates or sheets. This layer is intended to slightly agglomerate until sloughing off the plates and depositing on the bottom of the basin for removal. However normally over time, this agglomerated floc will stick to the plates or sheets and must be periodically cleaned off. Cleaning the floc off the plates or sheets is typically a manual process and requires the plant to stop clarification while this maintenance is performed. Therefore, it would be desirable to design a clarifier with improved plates or sheets that minimizes the agglomeration of floc thereon.

Purchasing existing plate or sheet clarifiers require high upfront costs, based in part on the cost of materials and installation associated therewith. For example, a clarifier utilizing stainless steel plates and designed to service a plant receiving 7.5 million gallons per day (MGD) costs over $630,000. A major part of this cost is associated with the stainless steel plates of the clarifier. The heavy weight of the stainless steel plates increases the cost of the clarifier because the infrastructure of the clarifier must be sufficiently robust to support the heavy steel plates. Therefore, it would be desirable to design a more cost-efficient clarifier compared to existing stainless steel plate clarifiers.

SUMMARY OF THE INVENTION

The present invention is directed to a clarifier for water treatment including: a plurality of planar inclined sheets including a flexible polymeric material. Each sheet includes a hydrophobic surface.

The flexible polymeric material may include a polyethylene (e.g., high density polyethylene (HDPE), low density polyethylene (LDPE), linear low density polyethylene (LLDPE)), polypropylene (PP), polytetrafluoroethylene (PTFE), polyvinyl chloride (PVC), polyester, or some combination thereof. The flexible polymeric material may be a hydrophobic material. A surface of the flexible polymeric material may be a fabric treated with a hydrophobic material to form the hydrophobic surface. The hydrophobic surface may have an average surface roughness (Sa) of from 3 to 100 µm. The clarifier may include a plurality of vertically-oriented supports, where a sheet of the plurality of planar inclined sheets is tensioned between the plurality of vertically-oriented supports. A vertically-oriented support of the plurality of vertically-oriented supports may include an inlet opening configured to allow liquid to flow therethrough. The plurality of planar inclined sheets are arranged parallel to one another, and each sheet of the plurality of planar inclined sheets may be tensioned between a plurality of vertically-oriented supports. Vertically-oriented supports tensioning a first sheet of the plurality of planar inclined sheets may interlock with adjacent vertically-oriented supports tensioning a second sheet of the plurality of planar inclined sheets. The parallel sheets may be positioned at an angle relative to the ground of from 10° to 90°.

The present invention is also directed to a water treatment system including: a basin; and a clarifier for water treatment including: a plurality of planar inclined sheets including a flexible polymeric material, where each sheet includes a hydrophobic surface, the clarifier positioned in the basin. The clarifier further includes a plurality of vertically-oriented supports. Each sheet of the plurality of planar inclined sheets is tensioned between the plurality of vertically-oriented supports.

The flexible polymeric material may include polyester, polyethylene (e.g., high density polyethylene (HDPE), low density polyethylene (LDPE), linear low density polyethylene (LLDPE)), polypropylene, polytetrafluoroethylene (PTFE), and/or polyvinyl chloride (PVC). The hydrophobic surface may have an average surface roughness (Sa) of from 3 to 100 µm. The plurality of planar inclined sheets may be arranged parallel to one another. Vertically-oriented supports tensioning a first sheet of the plurality of planar inclined sheets may interlock with adjacent vertically-oriented supports tensioning a second sheet of the plurality of planar inclined sheets. The parallel sheets may be positioned at an angle relative to the ground of from 10° to 90°. The water treatment system may further include a collection system including a collection trough arranged at least partially above the clarifier. The collection system may include a buoyant member configured to support the collection trough.

The present invention is also directed to a method for treating water including: providing the clarifier for water treatment including: a plurality of planar inclined sheets including a flexible polymeric material, where each sheet includes a hydrophobic surface, the clarifier positioned in the basin; flowing water to the clarifier; collecting clarified water and/or waste material separated from the water by the clarifier.

The flexible polymeric material may include polyester, polyethylene (e.g., high density polyethylene (HDPE), low density polyethylene (LDPE), linear low density polyethylene (LLDPE)), polypropylene, polytetrafluoroethylene (PTFE), and/or polyvinyl chloride (PVC).

The present invention is also directed to a clarifier for water treatment including: at least one module, each module including: a plurality of vertically-oriented supports; and a planar inclined sheet including a flexible polymeric material tensioned between the plurality of vertically-oriented supports.

The clarifier may include a plurality of inclined sheets including the flexible polymeric material tensioned between the plurality of vertically-oriented supports. The clarifier may include a plurality of modules, and the plurality of modules may interlock with one another. Each vertically-oriented support may include a first side including a tongue and a second side including a groove, where the plurality of modules interlock with one another by the tongue of a first vertically-oriented support engaging a groove of a second adjacent vertically-oriented support. The clarifier may include a plurality of modules, where the plurality of modules are arranged parallel to one another. The modules may be positioned at an angle relative to the ground of from 10° to 90°. The sheet may include a hydrophobic surface. The flexible polymeric material may include polyester, polyethylene (e.g., high density polyethylene (HDPE), low density polyethylene (LDPE), linear low density polyethylene (LLDPE)), polypropylene, polytetrafluoroethylene (PTFE), and/or polyvinyl chloride (PVC). The flexible polymeric material may be a hydrophobic material. A surface of the flexible polymeric material may be a fabric treated with a hydrophobic material to form the hydrophobic surface. The hydrophobic surface may have an average surface roughness (Sa) of from 3 to 100 µm. A vertically-oriented support of the plurality of vertically-oriented supports may include an inlet opening configured to allow liquid to flow therethrough.

The present invention is also directed to a water treatment system including: a basin; and a clarifier including: at least one module, each module including: a plurality of vertically-oriented supports; and a planar inclined sheet including a flexible polymeric material tensioned between the plurality of vertically-oriented supports, the clarifier positioned in the basin.

The water treatment system may include a plurality of modules, where the plurality of modules interlock with one another. Each vertically-oriented support may include a first side including a tongue and a second side including a groove, where the plurality of modules interlock with one another by the tongue of a first vertically-oriented support engaging a groove of a second adjacent vertically-oriented support. The water treatment system may include a plurality of modules, where the plurality of modules are arranged parallel to one another. The modules may be positioned at an angle relative to the ground of from 10° to 90°. The flexible polymeric material may include polyester, polyethylene (e.g., high density polyethylene (HDPE), low density polyethylene (LDPE), linear low density polyethylene (LLDPE)), polypropylene, polytetrafluoroethylene (PTFE), and/or polyvinyl chloride (PVC). A vertically-oriented support of the plurality of vertically-oriented supports may include an inlet opening configured to allow liquid to flow therethrough.

The present invention is also directed to a method for treating water including: providing a clarifier including: at least one module, each module including: a plurality of vertically-oriented supports; and a planar inclined sheet including a flexible polymeric material tensioned between the plurality of vertically-oriented supports; flowing water to the clarifier; and collecting clarified water and/or waste material separated from the water by the clarifier.

The present invention is also directed to a water collection system of a water treatment system including: a collection trough configured to receive liquid; and a buoyant member configured to support the collection trough.

The collection trough may include a plastic sheet. The collection trough may include a flexible material. The water collection system may further include at least one cable to support the collection trough. The buoyant member may include an inflatable bag or pontoon. The buoyant member may be configured to float in water.

The present invention is also directed to a water treatment system including: a basin; a clarifier positioned in the basin; and the water collection system including a collection trough configured to receive liquid; and a buoyant member configured to support the collection trough, the water collection system positioned at least partially above and in fluid communication with the clarifier.

The collection trough may include a plastic sheet. The collection trough may include a flexible material. The water collection system may further include at least one cable to support the collection trough. The buoyant member may include an inflatable bag or pontoon. The buoyant member may be configured to float in water.

The present invention is also directed to a method of collecting clarified water from a water treatment system including: providing a water treatment system including: a basin; a clarifier positioned in the basin; and the water collection system including a collection trough configured to receive liquid; and a buoyant member configured to support the collection trough, the water collection system positioned at least partially above and in fluid communication with the clarifier; flowing water to the clarifier; collecting clarified water, clarified from the water, in the collection trough.

The method may further include collecting waste material separated from the water by the clarifier. The waste materials may be configured to collect at a base of the clarifier. The collection trough may include a plastic sheet. The collection trough may include a flexible material. The water treatment system may further include at least one cable to support the collection trough. The buoyant member may include an inflatable bag or pontoon. The buoyant member may be configured to float in the water.

The present invention further includes the subject matter of the following clauses.

Clause 1: A clarifier for water treatment comprising: a plurality of planar inclined sheets comprising a flexible polymeric material, wherein each sheet comprises a hydrophobic surface.

Clause 2: The clarifier of clause 1, wherein the flexible polymeric material comprises polyester, polyethylene, polypropylene, polytetrafluoroethylene (PTFE), and/or polyvinyl chloride (PVC).

Clause 3: The clarifier of clause 1 or 2, wherein the flexible polymeric material is a hydrophobic material.

Clause 4: The clarifier of any of clauses 1-3, wherein a surface of the flexible polymeric material is a fabric treated with a hydrophobic material to form the hydrophobic surface.

Clause 5: The clarifier of any of clauses 1-4, wherein the hydrophobic surface has an average surface roughness (Sa) of from 3 to 100 µm.

Clause 6: The clarifier of any of clauses 1-5, further comprising a plurality of vertically-oriented supports, wherein a sheet of the plurality of planar inclined sheets is tensioned between the plurality of vertically-oriented supports.

Clause 7: The clarifier of clause 6, wherein a vertically-oriented support of the plurality of vertically-oriented supports comprises an inlet opening configured to allow liquid to flow therethrough.

Clause 8: The clarifier of any of clauses 1-7, wherein the plurality of planar inclined sheets are arranged parallel to one another, and each sheet of the plurality of planar inclined sheets is tensioned between a plurality of vertically-oriented supports.

Clause 9: The clarifier of clause 8, wherein vertically-oriented supports tensioning a first sheet of the plurality of planar inclined sheets interlock with adjacent vertically-oriented supports tensioning a second sheet of the plurality of planar inclined sheets.

Clause 10: The clarifier of clause 8 or 9, wherein the parallel sheets are positioned at an angle relative to the ground of from 10° to 90°.

Clause 11: A water treatment system comprising: a basin; and the clarifier according to any of clauses 1-10 positioned in the basin, the clarifier further comprising a plurality of vertically-oriented supports, wherein each sheet of the plurality of planar inclined sheets is tensioned between the plurality of vertically-oriented supports.

Clause 12: The water treatment system of clause 11, wherein the flexible polymeric material comprises polyester, polyethylene, polypropylene, polytetrafluoroethylene (PTFE), and/or polyvinyl chloride (PVC).

Clause 13: The water treatment system of clause 11 or 12, wherein the hydrophobic surface has an average surface roughness (Sa) of from 3 to 100 μm.

Clause 14: The water treatment system of any of clauses 11-13, wherein the plurality of planar inclined sheets are arranged parallel to one another.

Clause 15: The water treatment system of clause 14, wherein vertically-oriented supports tensioning a first sheet of the plurality of planar inclined sheets interlock with adjacent vertically-oriented supports tensioning a second sheet of the plurality of planar inclined sheets.

Clause 16: The water treatment system of clause 14 or 15, wherein the parallel sheets are positioned at an angle relative to the ground of from 10° to 90°.

Clause 17: The water treatment system of any of clauses 11-16, further comprising a collection system comprising a collection trough arranged at least partially above the clarifier.

Clause 18: The water treatment system of clause 17, wherein the collection system comprises a buoyant member configured to support the collection trough.

Clause 19: A method for treating water comprising: providing the clarifier according to any of clauses 1-10; flowing water to the clarifier; collecting clarified water and/or waste material separated from the water by the clarifier.

Clause 20: The method of clause 19, wherein the flexible polymeric material comprises polyester, polyethylene, polypropylene, polytetrafluoroethylene (PTFE), and/or polyvinyl chloride (PVC).

Clause 21: A clarifier for water treatment comprising: at least one module, each module comprising: a plurality of vertically-oriented supports; and a planar inclined sheet comprising a flexible polymeric material tensioned between the plurality of vertically-oriented supports.

Clause 22: The clarifier of clause 21, wherein a plurality of inclined sheets comprising the flexible polymeric material are tensioned between the plurality of vertically-oriented supports.

Clause 23: The clarifier of clause 21 or 22, comprising a plurality of modules, wherein the plurality of modules interlock with one another.

Clause 24: The clarifier of clause 23, wherein each vertically-oriented support comprises a first side comprising a tongue and a second side comprising a groove, wherein the plurality of modules interlock with one another by the tongue of a first vertically-oriented support engaging a groove of a second adjacent vertically-oriented support.

Clause 25: The clarifier of any of clauses 21-24, comprising a plurality of modules, wherein the plurality of modules are arranged parallel to one another.

Clause 26: The clarifier of clause 25, wherein the modules are positioned at an angle relative to the ground of from 10° to 90°.

Clause 27: The clarifier of any of clauses 21-26, wherein the sheet comprises a hydrophobic surface.

Clause 28: The clarifier of any of clauses 21-27, wherein the flexible polymeric material comprises polyester, polyethylene, polypropylene, polytetrafluoroethylene (PTFE), and/or polyvinyl chloride (PVC).

Clause 29: The clarifier of any of clauses 21-28, wherein the flexible polymeric material is a hydrophobic material.

Clause 30: The clarifier of any of clauses 27-29, wherein a surface of the flexible polymeric material is a fabric treated with a hydrophobic material to form the hydrophobic surface.

Clause 31: The clarifier of any of clauses 27-30, wherein the hydrophobic surface has an average surface roughness (Sa) of from 3 to 100 μm.

Clause 32: The clarifier of any of clauses 21-31, wherein a vertically-oriented support of the plurality of vertically-oriented supports comprises an inlet opening configured to allow liquid to flow therethrough.

Clause 33: A water treatment system comprising: a basin; and the clarifier according to any of clauses 21-32 positioned in the basin.

Clause 34: The water treatment system of clause 33, comprising a plurality of modules, wherein the plurality of modules interlock with one another.

Clause 35: The water treatment system of clause 34, wherein each vertically-oriented support comprises a first side comprising a tongue and a second side comprising a groove, wherein the plurality of modules interlock with one another by the tongue of a first vertically-oriented support engaging a groove of a second adjacent vertically-oriented support.

Clause 36: The water treatment system of any of clauses 33-35, comprising a plurality of modules, wherein the plurality of modules are arranged parallel to one another.

Clause 37: The water treatment system of clause 36, wherein the modules are positioned at an angle relative to the ground of from 10° to 90°.

Clause 38: The water treatment system of any of clauses 33-37, wherein the flexible polymeric material comprises polyester, polyethylene, polypropylene, polytetrafluoroethylene (PTFE), and/or polyvinyl chloride (PVC).

Clause 39: The water treatment system of any of clauses 33-38, wherein a vertically-oriented support of the plurality of vertically-oriented supports comprises an inlet opening configured to allow liquid to flow therethrough.

Clause 40: A method for treating water comprising: providing the clarifier according to any of clauses 21-32; flowing water to the clarifier; and collecting clarified water and/or waste material separated from the water by the clarifier.

Clause 41: A water collection system of a water treatment system comprising: a collection trough configured to receive liquid; and a buoyant member configured to support the collection trough.

Clause 42: The water collection system of clause 41, wherein the collection trough comprises a plastic sheet.

Clause 43: The water collection system of clause 41 or 42, wherein the collection trough comprises a flexible material.

Clause 44: The water collection system of any of clauses 41-43, further comprising at least one cable to support the collection trough.

Clause 45: The water collection system of any of clauses 41-44, wherein the buoyant member comprises an inflatable bag or pontoon.

Clause 46: The water collection system of any of clauses 41-45, wherein the buoyant member is configured to float in water.

Clause 47: A water treatment system comprising: a basin; a clarifier positioned in the basin; and the water collection system of any of clauses 41-46 positioned at least partially above and in fluid communication with the clarifier.

Clause 48: The water treatment system of clause 47, wherein the collection trough comprises a plastic sheet.

Clause 49: The water treatment system of clause 47 or 48, wherein the collection trough comprises a flexible material.

Clause 50: The water treatment system of any of clauses 47-49, further comprising at least one cable to support the collection trough.

Clause 51: The water treatment system of any of clauses 47-50, wherein the buoyant member comprises an inflatable bag or pontoon.

Clause 52: The water treatment system of any of clauses 47-51, wherein the buoyant member is configured to float in water.

Clause 53: A method of collecting clarified water from a water treatment system comprising: providing the water treatment system of any of clauses 47-52; flowing water to the clarifier; collecting clarified water, clarified from the water, in the collection trough.

Clause 54: The method of clause 53, further comprising collecting waste material separated from the water by the clarifier.

Clause 55: The method of clause 54, wherein the waste materials are configured to collect at a base of the clarifier.

Clause 56: The method of any of clauses 53-55, wherein the collection trough comprises a plastic sheet.

Clause 57: The method of any of clauses 53-56, wherein the collection trough comprises a flexible material.

Clause 58: The method of any of clauses 53-57, wherein the water treatment system further comprises at least one cable to support the collection trough.

Clause 59: The method of any of clauses 53-58, wherein the buoyant member comprises an inflatable bag or pontoon.

Clause 60: The method of any of clauses 53-59, wherein the buoyant member is configured to float in the water.

Clause 61: A clarifier for water treatment comprising: a plurality of inclined tubes comprising a flexible polymeric material, wherein each tube comprises a hydrophobic surface.

Clause 62: The clarifier of clause 61, wherein the flexible polymeric material comprises polyester, polyethylene, polypropylene, polytetrafluoroethylene (PTFE), and/or polyvinyl chloride (PVC).

Claus 63: The clarifier of clause 61 or 62, wherein the flexible polymeric material is a hydrophobic material.

Clause 64: The clarifier of any of clauses 61-63, wherein a surface of the flexible polymeric material is a fabric treated with a hydrophobic material to form the hydrophobic surface.

Clause 65: The clarifier of any of clauses 61-64, wherein the hydrophobic surface has an average surface roughness (Sa) of from 3 to 100 μm.

Clause 66: The clarifier of any of clauses 61-65, further comprising a support co-acting with the plurality of inclined tubes so as to support the plurality of inclined tubes.

Clause 67: The clarifier of any of clauses 61-66, wherein the plurality of inclined tubes forms a honeycomb structure.

Clause 68: The clarifier of any of clauses 61-67, wherein a first tube of the plurality of inclined tubes is fixed to an adjacent second tube of the plurality of inclined tubes.

Clause 69: The clarifier of any of clauses 61-68, wherein the plurality of inclined tubes are positioned at an angle relative to the ground of from 10° to 90°.

Clause 70: The water treatment system of any of clauses 11-18 or 33-39, further comprising a sparging system configured to bubble gas to the clarifier to clean the sheets.

Clause 71: The clarifier of any of clauses 1-10 or 21-32, where the sheets comprise a sag.

DESCRIPTION OF THE INVENTION

Figure 1:
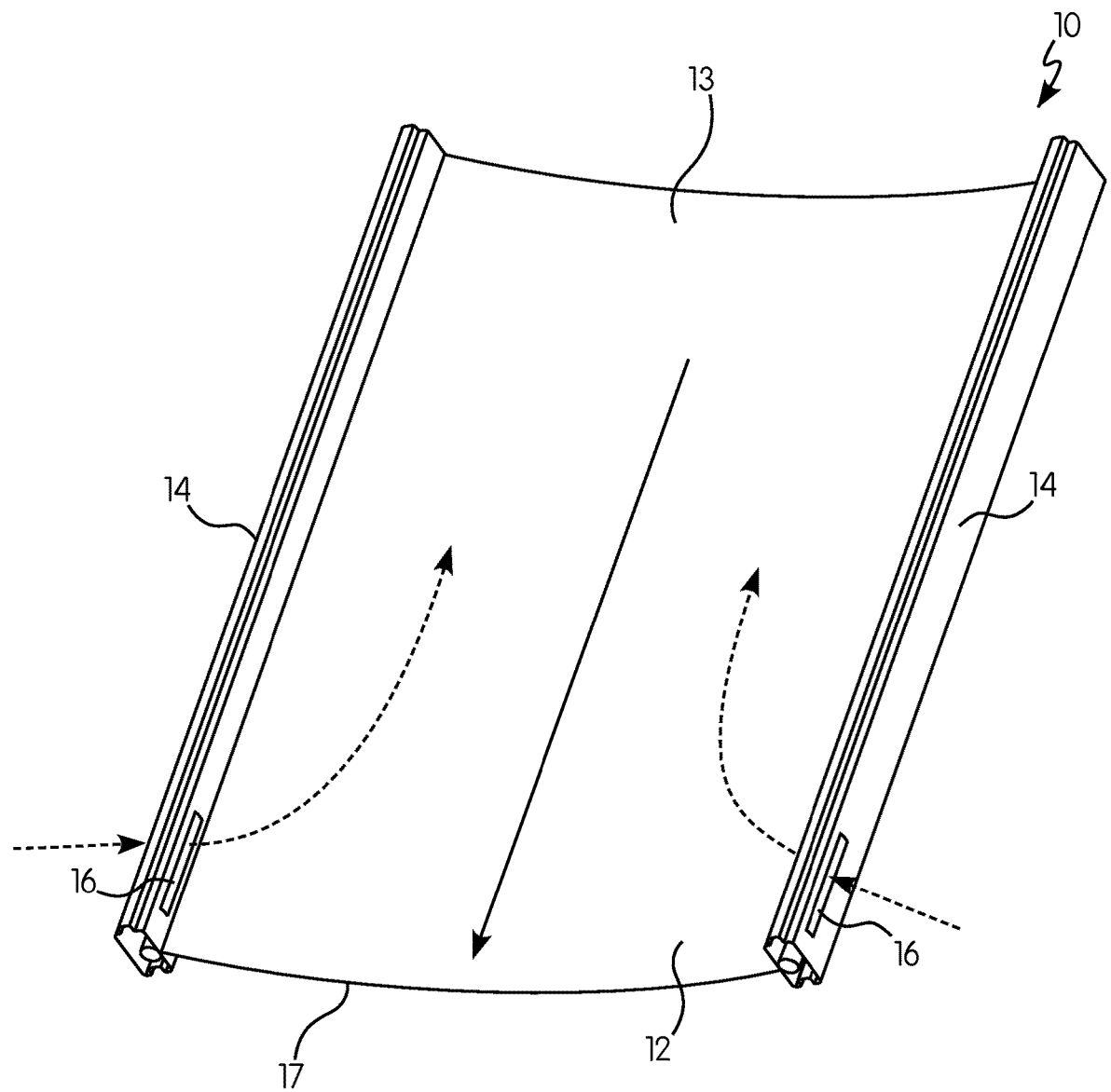
FIG. 1 shows a perspective view of a module of a clarifier for water treatment.

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

Referring to FIG. 1, a module 10 for use in a clarifier for water treatment according to a non-limiting embodiment is shown. The module 10 includes a sheet 12 having a hydrophobic surface 13, the sheet 12 including a flexible polymeric material. The sheet may be substantially planar. In some non-limiting embodiments, the flexible polymeric material may be a hydrophobic material. As used herein, the term "hydrophobic material" or "hydrophobic surface" refers to a material or surface which exhibits a Water Contact Angle (WCA) of at least 90° when contacted with water. In some non-limiting examples, the flexible polymeric material includes a fabric treated with a hydrophobic material to form the hydrophobic surface 13. Examples of hydrophobic material includes a silica gel, PTFE, graphite, and/or graphene. The flexible polymeric material may include polyester, polyethylene (e.g., high density polyethylene (HDPE), low density polyethylene (LDPE), linear low density polyethylene (LLDPE)), polypropylene, polytetrafluoroethylene (PTFE), polyvinyl chloride (PVC), or some combination thereof.

In some non-limiting embodiments, the hydrophobic surface 13 may an average surface roughness (Sa) of from 5 to 20 μm. As measured and reported herein, average surface roughness (Sa) is a measure of a 3D surface according to the following equation:

$$S_\alpha = \iint_\alpha |Z(x,y)| dx dy$$

In the equation Z(x,y) is the function representing the height of the surface relative to the best fitting plate, and 'a' indicates that the integration is performed over the area of measurement.

The hydrophobic surface 13 may have a micron-level Sa of from 3 to 100 μm. The hydrophobic surface 13 may have a rough surface. As used herein, rough may refer to a surface having a Sa≥15 μm, such as 15 μm≤Sa≤100 μm. The hydrophobic surface 13 may have a smooth surface. As used herein, smooth may refer to a surface having a Sa<15 μm.

With continued reference to FIG. 1, the module 10 may include a plurality of vertically-oriented supports 14. The vertically-oriented supports 14 may be arranged non-parallel with the ground and may form an angle with the ground of from 10° to 90°, such as from 20° to 80°, from 35° to 70°, from 40° to 60°, from 45° to 65°, or from 45° to 55°, so as to be inclined. The angle formed by the vertically-oriented supports 14 relative to the ground may be varied. The angle may be varied using any suitable system, including using the cables used to support the clarifier described hereinafter. At least one of the sheets 12 may be tensioned between the vertically-oriented supports 14. The sheet 12 tensioned between the vertically-oriented supports 14 may form the same angle relative to the ground as the vertically-oriented supports 14. The sheet 12 may be tensioned between the vertically-oriented supports 14 so as to be taut therebetween, or the sheet may be tensioned between the vertically-oriented supports such that the sheet 12 includes some sag. Because the supports are vertically-oriented supports 14 (as opposed to supports arranged parallel to the ground), any sag in the sheet may cause gravity to force waste materials (solids) to the center and bottom of the module 10, as opposed to the waste materials settling toward the center of the sheet 12 at some point higher than the bottom of the sheet 12. This is because the sag helps concentrate the accumulated solids to the center of the sheet 12, similar to a chute. This also helps separate the influent from the waste stream to improve overall clarification by not disturbing the waste stream with the influent water. Thus, the sheet 12 tensioned between the vertically-oriented supports 14 is arranged so as to form the inclined module 10 having an inclined sheet 12.

With continued reference to FIG. 1, at least one of the vertically-oriented supports 14 may include an inlet opening 16 configured to allow liquid to flow therethrough. The dashed arrows and solid arrow show the flow of water and waste materials in the non-limiting embodiment of the module 10 shown. Water enters the module 10 through the inlet openings 16 of the vertically-oriented supports as shown by the dashed arrows. As the water moves up the inclined sheet 12, it is clarified by the waste materials (e.g., sludge) contained in the water flowed to the module 10 settling to the bottom of the module 10 at the base 17 of the clarifier. The flow of waste materials settling at the base 17 is shown by the solid arrow.

Figure 2:
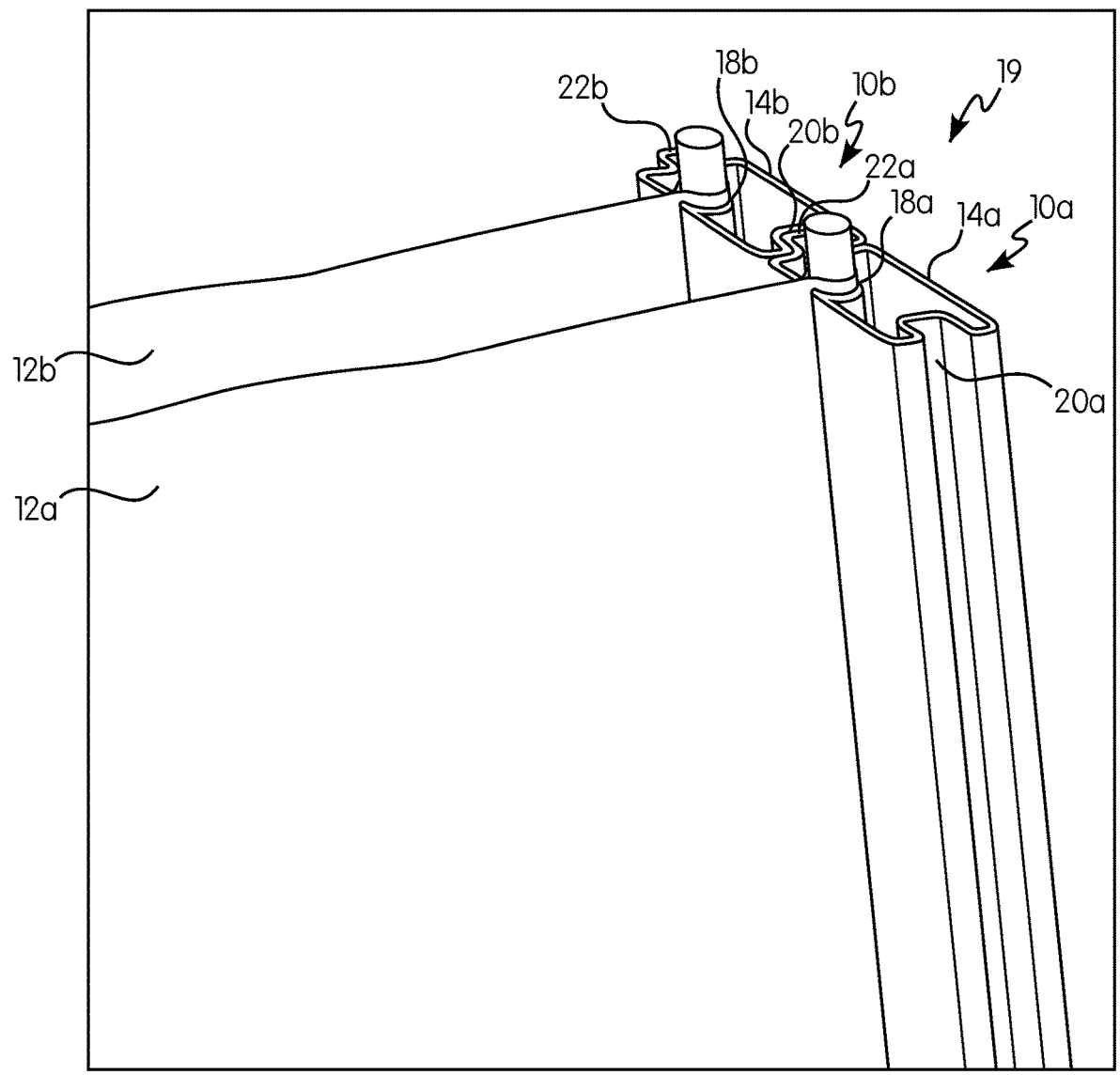
FIG. 2 shows a perspective view of two interlocked modules of a clarifier for water treatment.

Referring to FIG. 2, a clarifier 19 is shown according to one non-limiting embodiment. The clarifier 19 may include a plurality of planar inclined sheets 12a, 12b. The clarifier 19 includes at least one module 10a, 10b, and in the example shown in FIG. 2, includes two modules 10a, 10b. It will be appreciated that any number of modules 10a, 10b may be used in the clarifier 19. The plurality of sheets 12a, 12b may be arranged in the clarifier 19 parallel to one another, with each sheet 12a, 12b tensioned between a plurality of vertically-oriented supports 14 (they may be the same or different vertically-oriented supports 14). The modules 10a, 10b may also be arranged in the clarifier 19 parallel to one another.

With continued reference to FIG. 2, a non-limiting embodiment of the vertically-oriented supports 14a, 14b is shown. The vertically-oriented supports 14a, 14b may include a recess 18a, 18b to receive the sheet 12a, 12b, such that the sheet 12a, 12b can be tensioned between the vertically-oriented supports 14a, 14b. The sheet 12a, 12b may be fitted over a rod, which is inserted into the recess 18a, 18b, such that the sheet 12a, 12b can be tensioned between the vertically-oriented supports 14a, 14b.

With continued reference to FIG. 2, the modules 10a, 10b of the clarifier 19 may interlock with one another. In one non-limiting embodiment, a first module 10a may interlock with a second adjacent module 10b by the vertically-oriented supports 14a of the first module 10a interlocking with the vertically-oriented supports 14b of the second module 10b. The vertically-oriented supports 14a, 14b may include a first side including a groove 20a, 20b and a second side including a tongue 22a, 22b. The vertically-oriented supports 14a, 14b may interlock with one another by the groove 20b of the first vertically-oriented support 14a engaging the tongue 22a of the second vertically-oriented support 14b.

Figure 3:
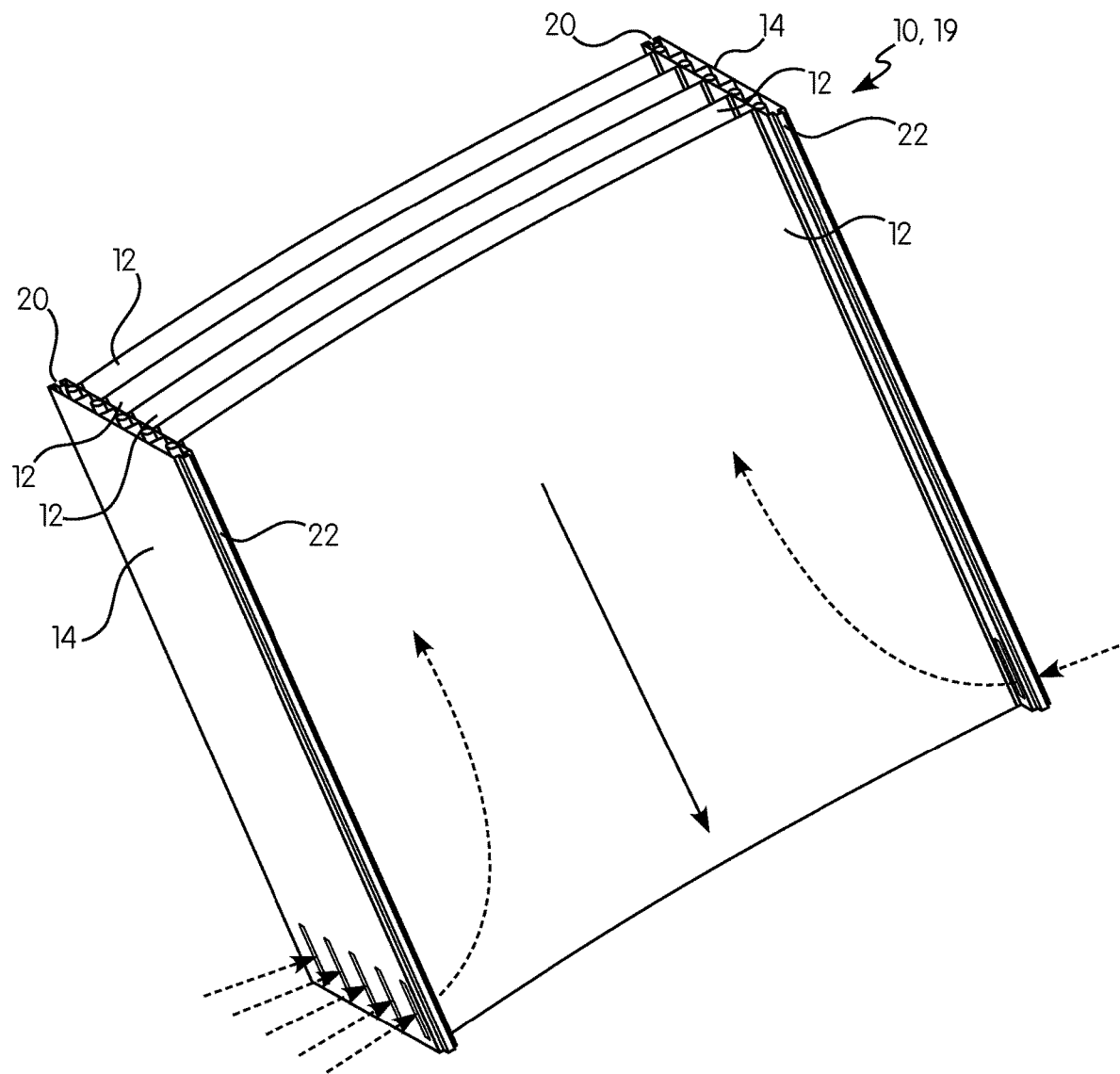
FIG. 3 shows a perspective view of a module including a plurality of planar inclined sheets including flexible polymeric material.
Figure 4:
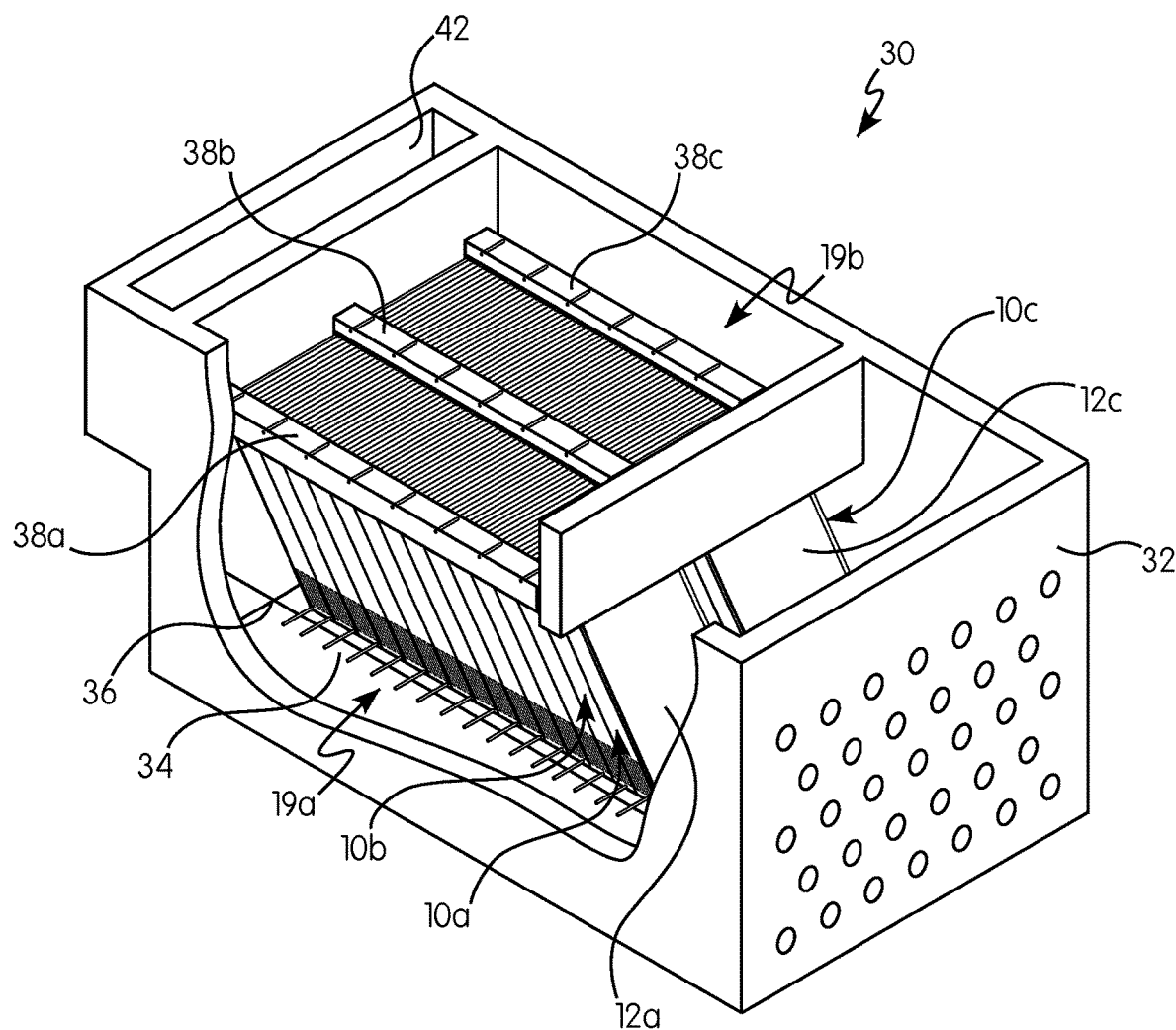
FIG. 4 shows a perspective view of a water treatment system.
Figure 5:
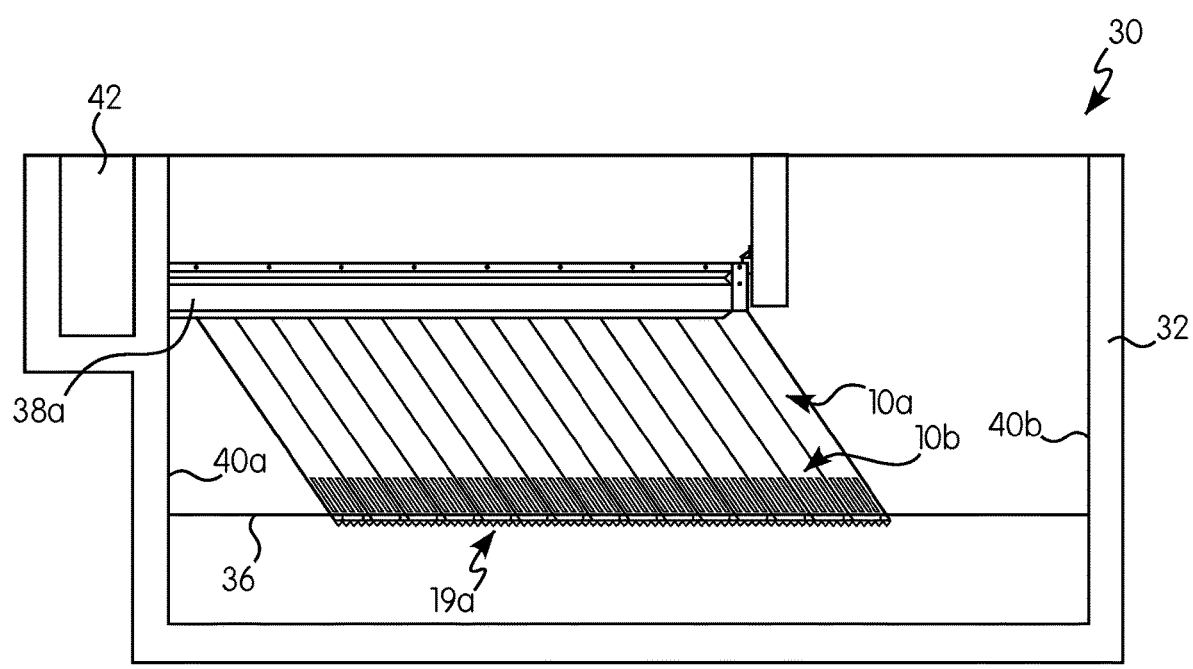
FIG. 5 shows a side view of the water treatment system of FIG. 4.
Figure 6:
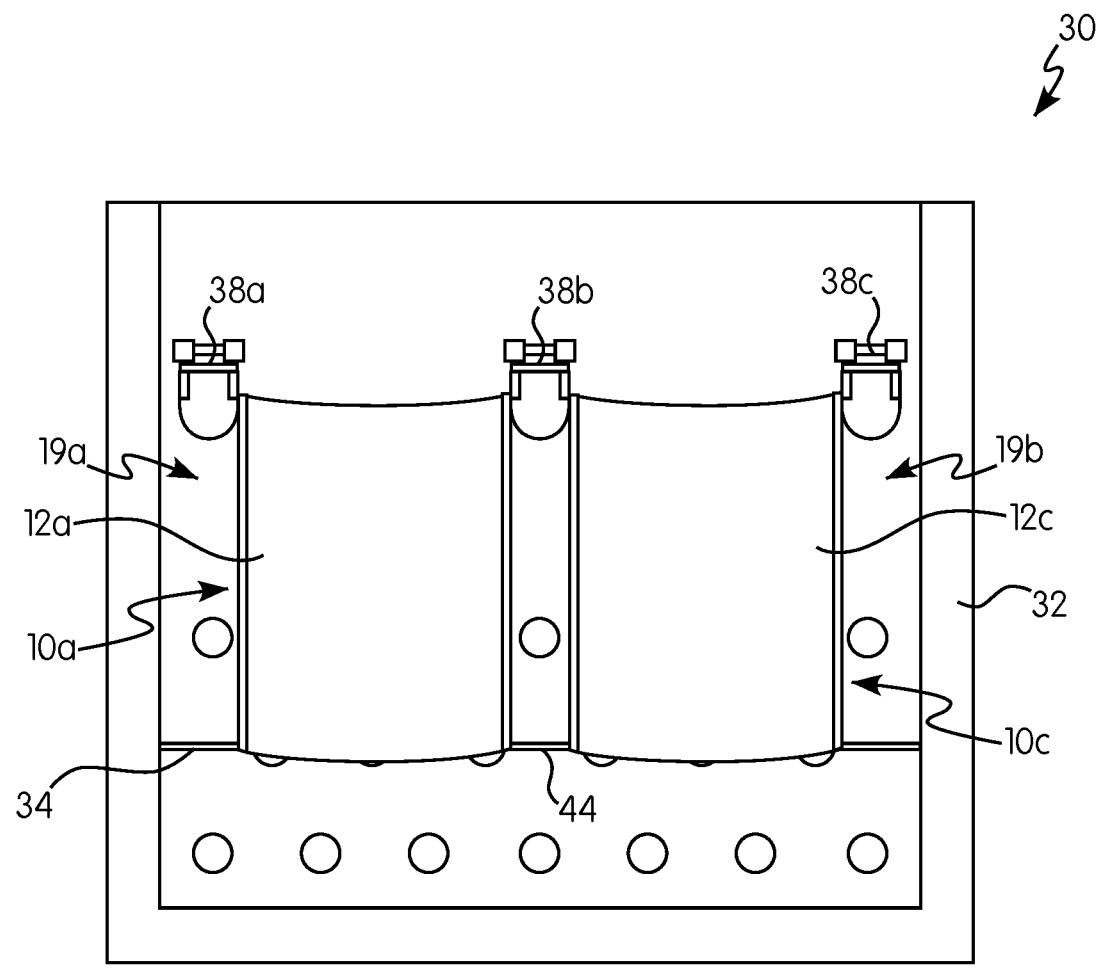
FIG. 6 shows a front view of the water treatment system of FIG. 5.
Figure 7:
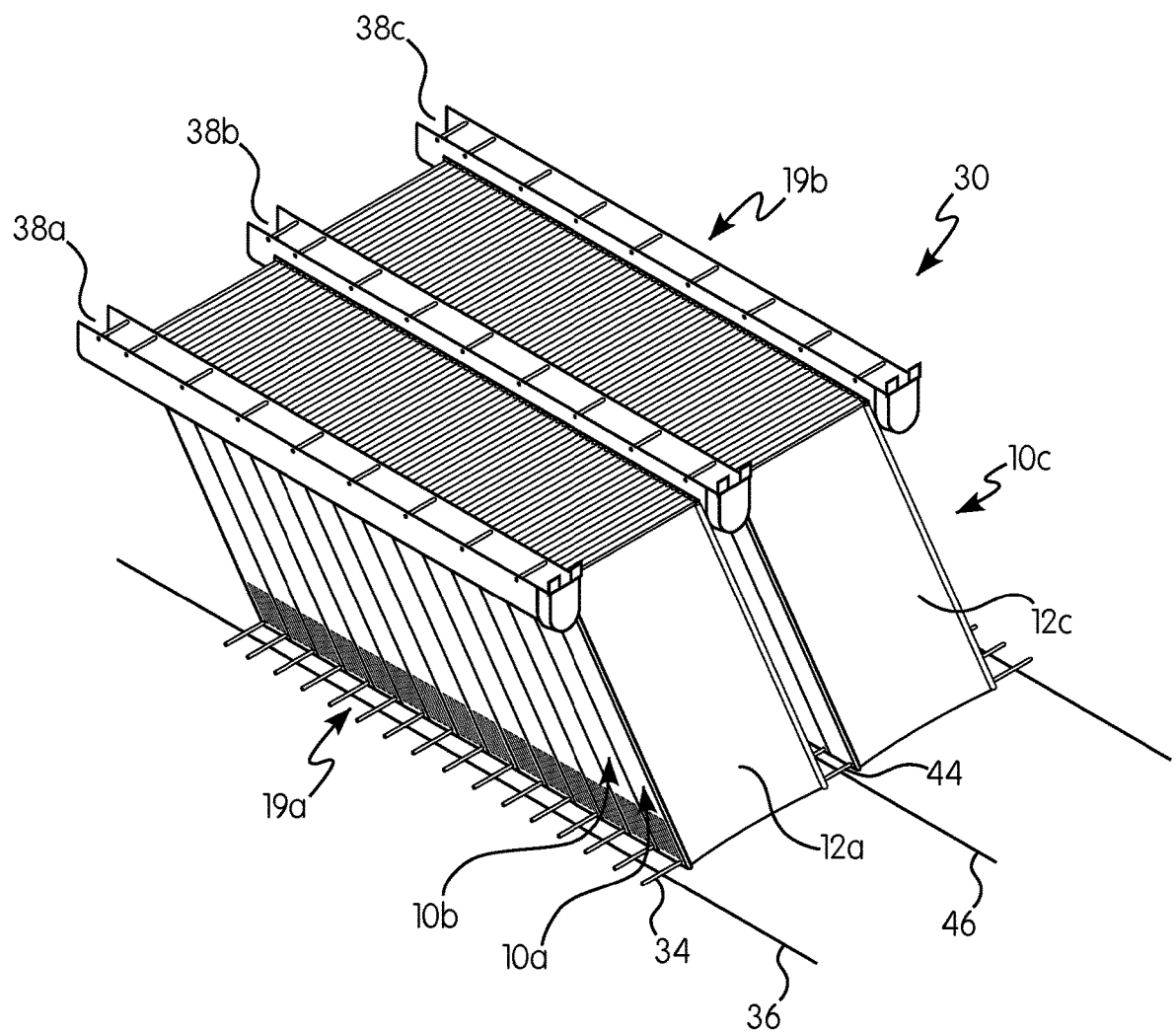
FIG. 7 shows a perspective view of the clarifier shown in FIG. 4 not positioned in a basin.

Referring to FIG. 3, another non-limiting embodiment of a clarifier 19 is shown, which include the module 10. The module 10 shown in FIG. 4 includes the vertically-oriented supports 14 as previously described. The vertically-oriented supports 14 include the tongue 22 and groove 20 as previously described. In this non-limiting embodiment, the vertically-oriented supports 14 tension a plurality of sheets 12 therebetween. Five sheets 12 are tensioned between the vertically-oriented supports 14 in this particular embodiment, but it will be appreciated that any number of sheets 12 may be tensioned between vertically-oriented supports 14 of any single module 10.

Referring to FIGS. 4-7, a water treatment system 30 is shown according to a non-limiting embodiment. The water treatment system 30 includes a basin 32 defined by a plurality of walls and a floor. The water treatment system 30 includes at least one clarifier 19a, 19b positioned in the basin 32.

With continued reference to FIGS. 4-7, the clarifier 19a, 19b may be supported in the basin 32 using any suitable arrangement. In one such non-limiting arrangement, each module 10a, 10b includes at least one rod 34 which extends proximate a lower section of the module 10a, 10b. A lower cable 36 may engage each of the rods 34, and the ends of the lower cable 36 may be fastened to a wall 40a, 40b of the basin 32, such that the wall 40a, 40b of the basin 32 provides support to the clarifier 19a, 19b.

Clarifiers 19a, 19b may be arranged side-by-side as shown in FIGS. 4-7 (e.g., module 10a of the first clarifier 19a is arranged side-by-side with module 10c of the second clarifier 19b). A center rod 44 may extend between side-by-side clarifiers 19a, 19b to fix the side-by-side clarifiers 19a, 19b relative to one another. The center rods 44 may extend from each module 10a, 10c of the clarifier 19a, 19b, proximate a lower section of the modules 10a, 10c. A center cable 46 may engage the center rods 44 and the ends of the center cable 46 may be fastened to the wall of the basin 40a, 40b as previously described. The rods 34 and the center rods, 44 may engage the lower cable 36 and/or the center cable 46 to act as a rigid support for the cables 36, 46, which span a relatively long distance between their ends. The rods 34 may also function to increase or decrease tension on the sheets 12, so as to increase or decrease the curvature of the sheets 12.

With continued reference to FIGS. 4-7, the clarifier 19a, 19b may further include a collection system including a collection trough 38a, 38b, 38c arranged at least partially above the clarifier 19a, 19b. The collection trough 38a, 38b, 38c may be configured to receive clarified water flowing through the clarifier 19a, 19b, such as the water flowing out the top of the clarifier 19a, 19b, which has been clarified by gravity causing the waste materials from the waste water flowed to the clarifier 19a, 19b being settled to the bottom.

With continued reference to FIGS. 4-7, the basin 32 may include an effluent channel 42, into which clarified water treated by the water treatment system 30 is flowed. In some non-limiting examples, the clarified water may flow from the collection trough 38a, 38b, 38c into the effluent channel 42.

Figure 8:
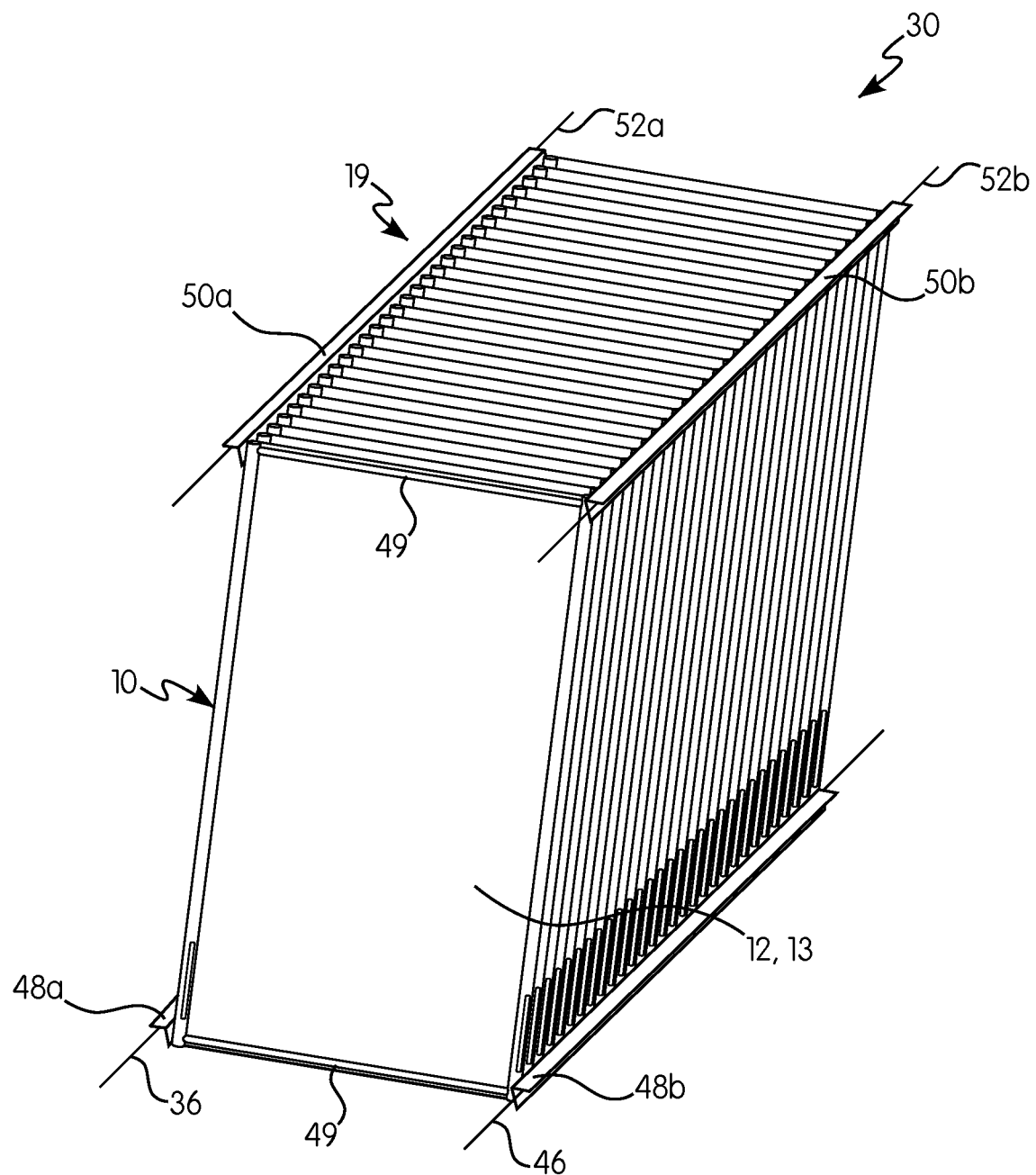
FIG. 8 shows a perspective view of a water treatment system having a clarifier supported using upper cables.

Referring to FIG. 8, another water treatment system 30 is shown according to a non-limiting embodiment. In this non-limiting embodiment, a lower track 48a, 48b may be used instead of the previously-described configuration using rods to engage the lower cable 36 and the center cable 46. The lower track 48a, 48b may be positioned proximate the bottom of the sheet 12. The lower track 48a, 48b may engage the lower cable 36 and/or the center cable 46 to act as a rigid support for the cables 36, 46, which span a relatively long distance between their ends.

With continued reference to FIG. 8, spacer bars 49 may be further included to span horizontally (parallel to the ground) across the sheet 12 of the module 10. The spacer bars 49 may be arranged proximate the top and/or the bottom of the sheet 12, as shown in FIG. 8. The spacer bars 49 may be adjustable in length so that the width between sides of the sheet may be adjusted, thereby achieving the desired curvature (sag) of the sheet 12, if any curvature is desired.

With continued reference to FIG. 8, upper tracks 50a, 50b and upper cables 52a, 52b may also be used as further support for the clarifier 19. The upper track 50a, 50b may be positioned proximate the top of the sheet 12 and may engage the upper cables 52a, 52b to act as a rigid support for the upper cables 52a, 52b, which span a relatively long distance between their ends.

Figure 9:
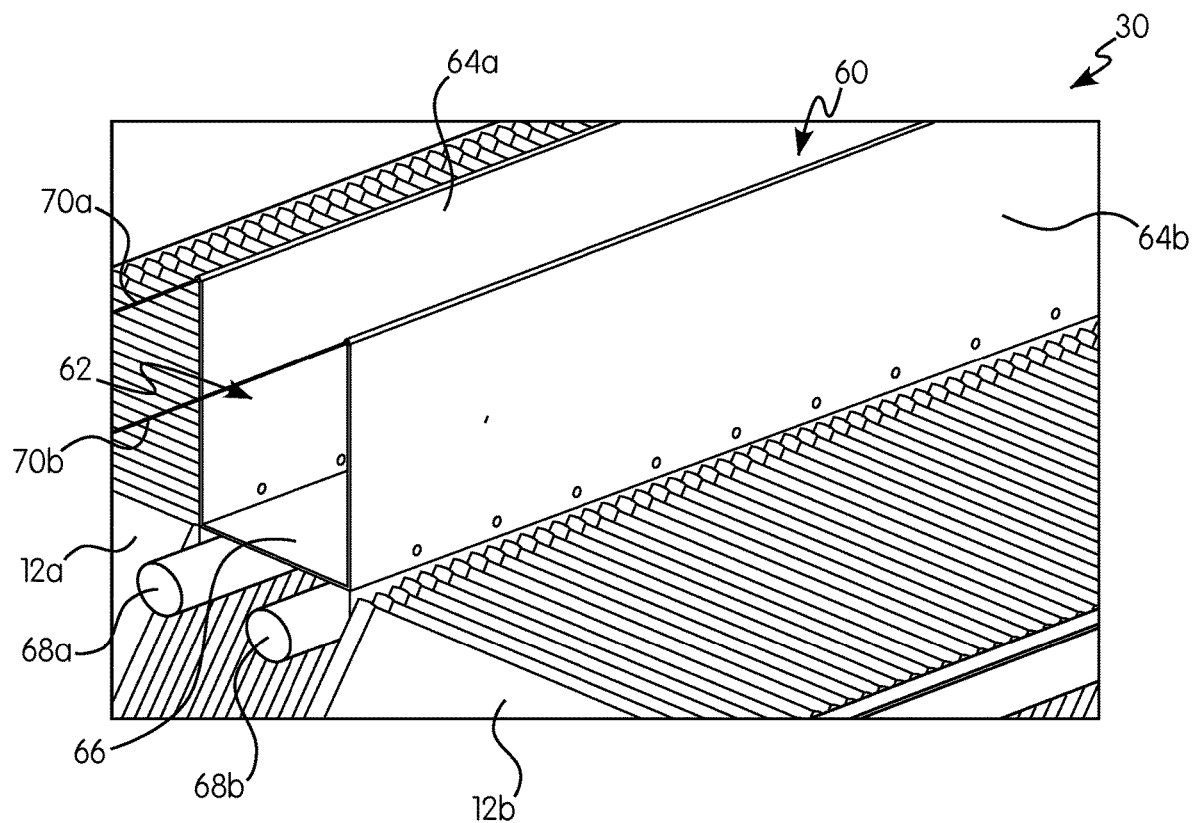
FIG. 9 shows a perspective view of a water collection system utilizing buoyant members.

Referring to FIG. 9, a water collection system 60 of a water treatment system 30 is shown. The water collection system 60 includes a buoyant collection trough 62 configured to receive a liquid, such as clarified water from the top of the clarifier. The collection trough 62 may include a plurality of trough walls 64a, 64b connected by a trough base 66. The trough walls 64a, 64b, and the trough base 66 may include a plastic sheet and/or a flexible material, and the trough walls 64a, 64b and the trough base 66 may be made of polyester, polyethylene (e.g., high density polyethylene (HDPE), low density polyethylene (LDPE), linear low density polyethylene (LLDPE)), polypropylene, polytetrafluoroethylene (PTFE), polyvinyl chloride (PVC), or some combination thereof. The trough walls 64a, 64b, and the trough base 66 may include a light weight material. At least one trough cable 70a, 70b may be used to support the trough walls 64a, 64b, and the ends of the trough cables 70a, 70b may be fastened to the basin walls, such that the basin walls support the trough walls 64a, 64b.

With continued reference to FIG. 9, the water collection system 60 may further include a buoyant member 68a, 68b configured to support the collection trough 62. In one non-limiting example, the buoyant members 68a, 68b may include an inflatable bag(s) configured to receive gas and to float in water in the basin 32 and flowed through the clarifier so as to support the collection trough 62. The buoyant members 68a, 68b may include a pontoon having a plastic tube filled with water and/or air such that the buoyant members 68a, 68b float to support the collection trough 62. In some examples, the trough base 66 may be a buoyant member 68a. The buoyant members 68a, 68b may co-act with the trough base 66 and may support and level the trough base 66 (and thus the collection trough 62) and the clarifiers to keep them from sagging with the catenary of the cables 70a, 70b. The buoyant members 68a, 68b may be positioned below the collection trough 62.

Figure 10:
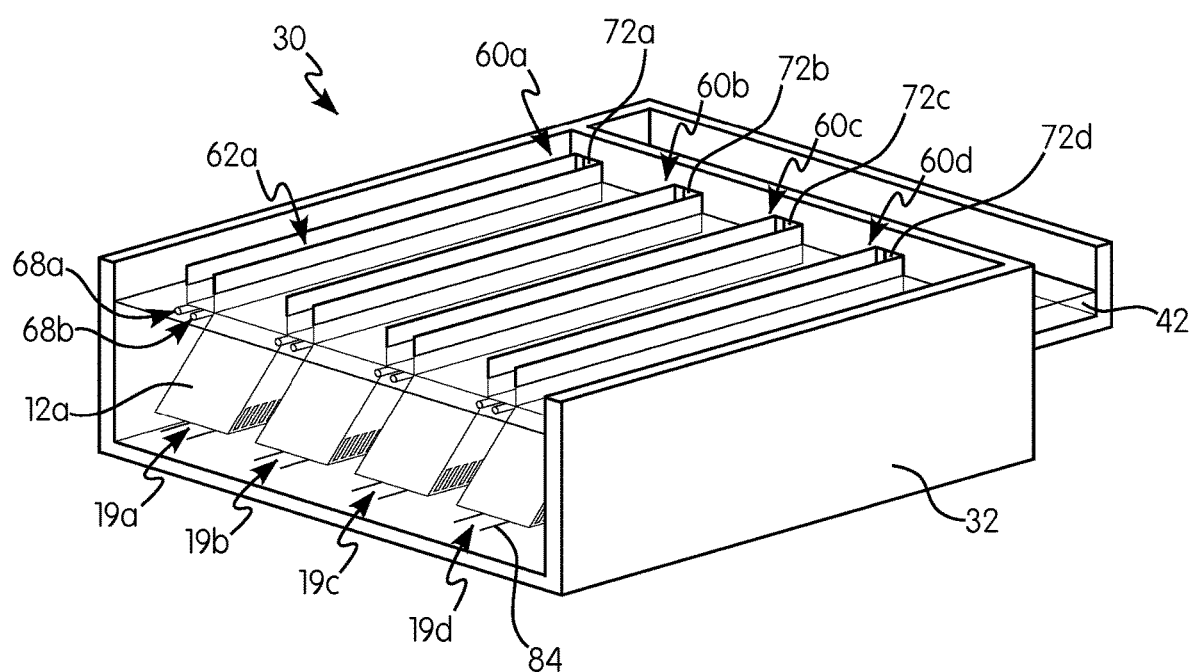
FIG. 10 shows a perspective view of a water treatment system including the water collection system of FIG. 9.

Referring to FIG. 10, a water treatment system 30 according to one non-limiting embodiment is shown. The water treatment system includes the basin 32, a clarifier 19a, 19b, 19c, 19d (four in this particular example) positioned in the basin 32, and a water collection system 60a, 60b, 60c, 60d positioned at least partially above each of the clarifiers 19a, 19b, 19c, 19d. The water collection systems 60a, 60b, 60c, 60d are in fluid communication with each of the respective clarifiers 19a, 19b, 19c, 19d. The water treatment system 30 may further include an effluent outlet 72a, 72b, 72c, 72d defined in a wall of the basin 32 between each of the water collection systems 60a, 60b, 60c, 60d (such as collection trough 62a) and the effluent channel 42.

With continued reference to FIG. 10, a method for treating water may include providing a clarifier 19 as described herein. Water may be flowed into the basin 32 and may flow to the clarifier 19. Waste material from the water may settle to the bottom of the clarifier 19 by gravity forcing the waste material to flow down the hydrophobic surface 13 of the inclined sheet 12, while the clarified water (having less waste materials therein compared to the initial water) continues to flow up the inclined sheet 12 and into the water collection system 60. The clarified water may be collected in the collection trough 62 of the water collection system 60. Thus, the method includes collecting clarified water and/or waste materials that have been separated by the clarifier 19 from the initial water.

With continued reference to FIG. 10, the water treatment system 30 may further include a sparging system 84 positioned in the basin 32. The sparging system 84 may be positioned on the bottom of the basin 32. The sparging system 84 may include air lines running along beneath and along the length of the clarifiers 19*a*-19*d*, which include small orifices to bubble air to the clarifiers for cleaning. The sparging system 84 may flow air or other inert gas into the water to encourage removal of sediment from the surface of the sheets 12*a*. The air may remove sediment from the surface of the sheets 12*a* by agitating the sheets 12*a* (exerting a force thereon) to loosen any accumulation of sediment forming on the surface of the sheet 12*a*. Since the sheets 12*a* are made of the flexible polymeric material, the air bubbles formed from beneath the sheets 12*a* may exert a force against the underside of the sheets 12 so that they move to loosen the accumulation thereon. The sheets 12*a* may be agitated to encourage removal of the sediment using other potential arrangements. For example, the water flow to the basin 12 may be pulsed to agitate the sheets 12*a*. In another example, the cables of the water treatment system 30 may be moved to agitate the sheets 12*a*.

Figure 11:
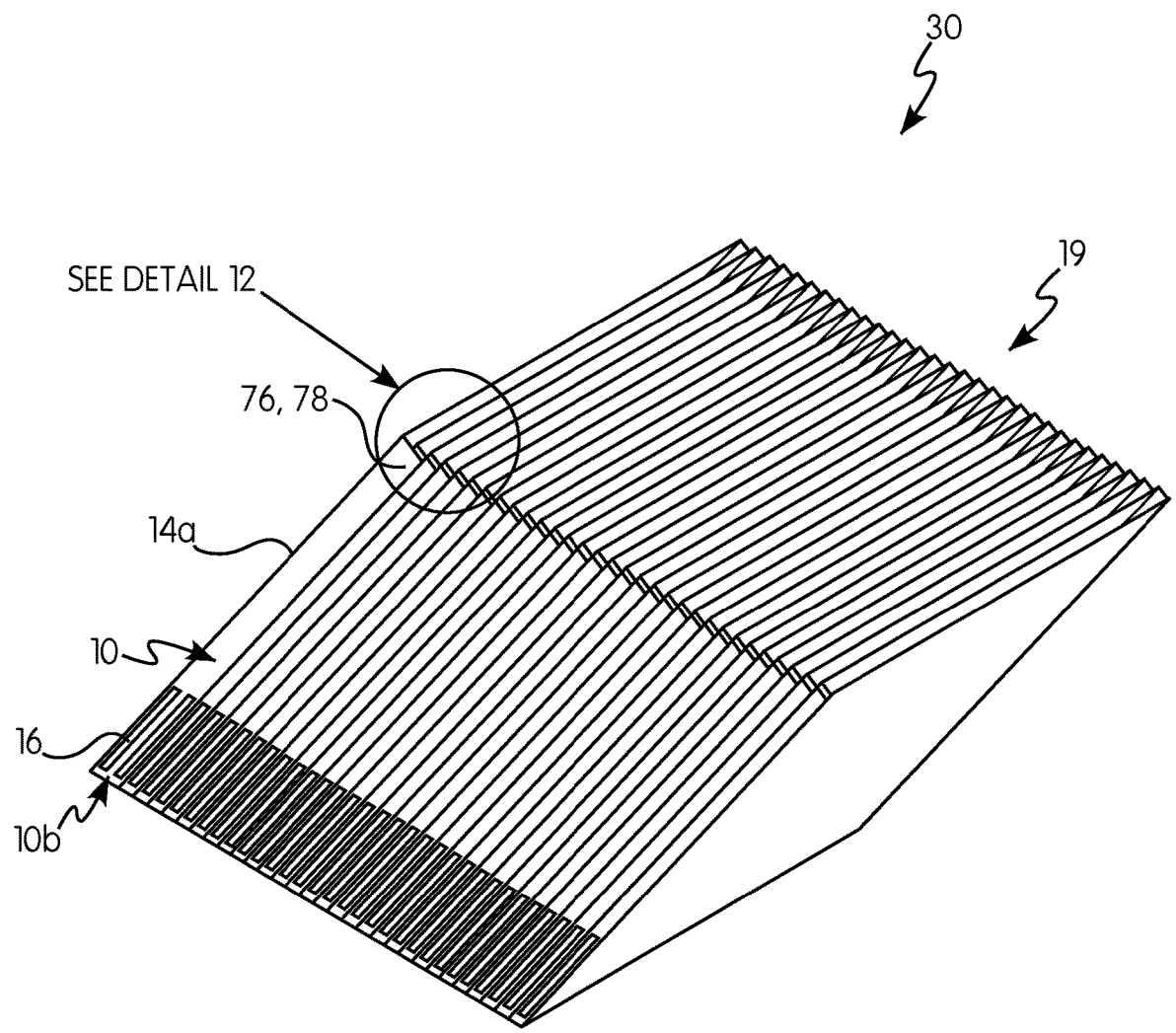
FIG. 11 shows a perspective view of another embodiment of a water treatment system.
Figure 12:
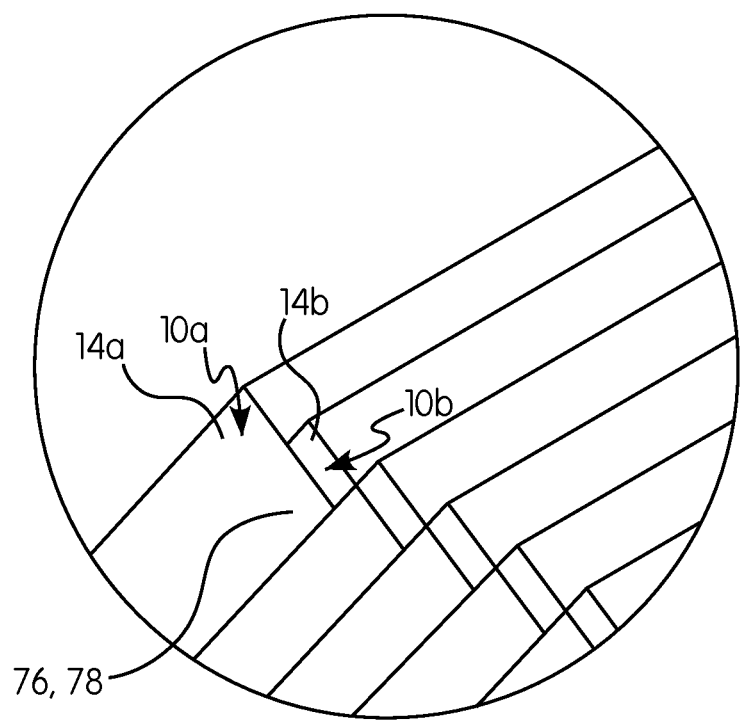
FIG. 12 shows a close-up perspective view of the modules of the water treatment system of FIG. 11 welded together.

Referring to FIGS. 11 and 12, another embodiment of a water treatment system 30 including a clarifier 19 having a plurality of parallel inclined modules 10*a*, 10*b* having planar inclined sheets including the flexible polymeric material is shown. In this particular embodiment, the support 14*a* of a first module 10*a* may include an overlap material that overlaps the support 14*b* of the adjacent second module 10*b* so as to form an overlap 76. The overlap 76 may include a weld 78 or other fastening arrangement (sewing, chemical bonding, gluing, and the like) such that the overlap material of the first support 14*a* is fixed to the second support 14*b* to fix the first module 10*a* relative to the second module 10*b*. Other arrangements for fixing one module to an adjacent module are also within the scope of the invention.

Figure 13:
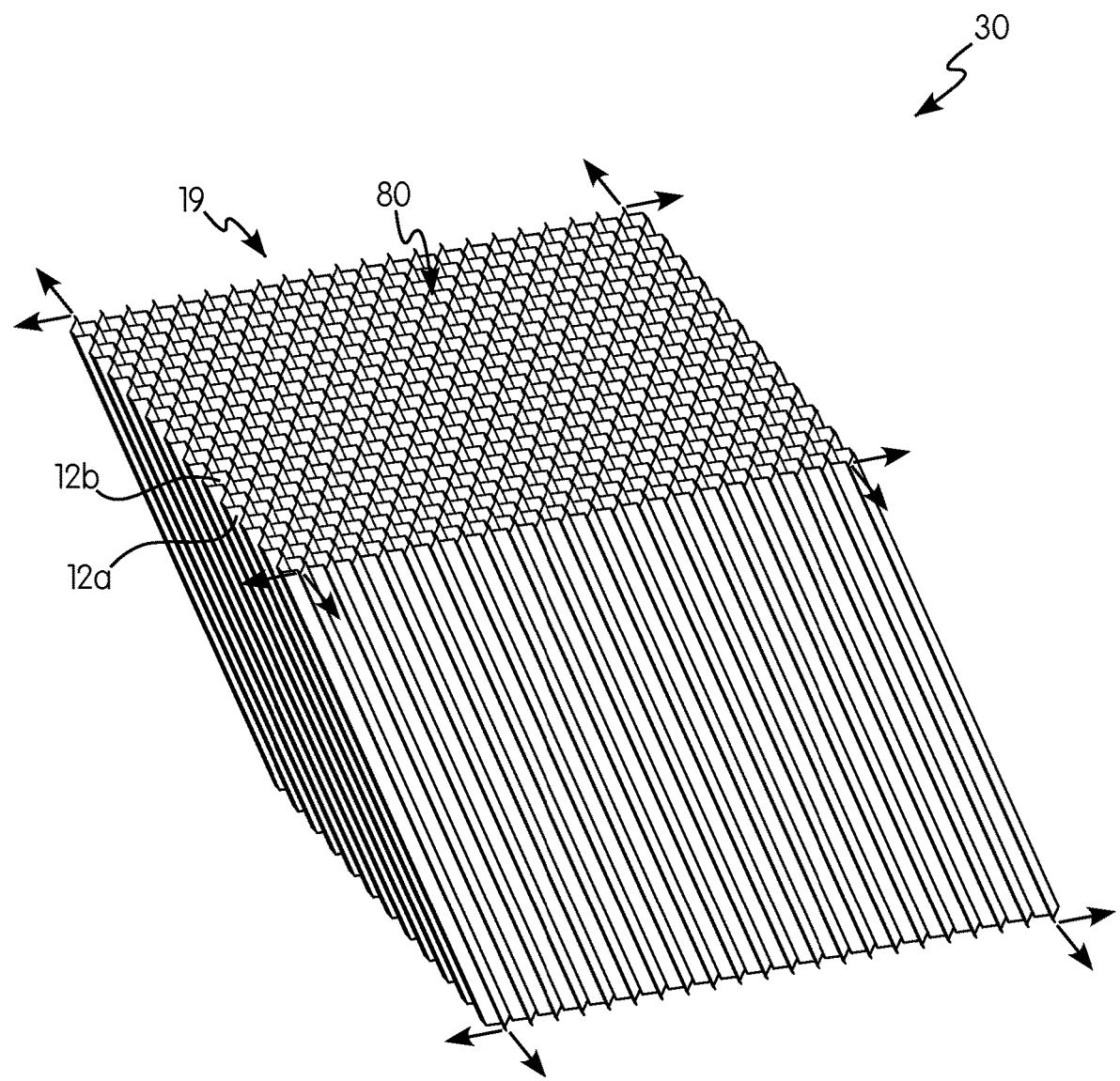
FIG. 13 shows a perspective view of another embodiment of a water treatment system having a tube clarifier.

Referring to FIG. 13, a water treatment system 30 having a tube clarifier 19 is shown. The tube clarifier 19 may include a plurality of inclined tubes 80 formed from a flexible material. The flexible material may define a cavity so as to form the tube 80. The tube may have a cross-section of any suitable shape, such as a circle, oval, square, rectangle, or honeycomb. The flexible material may include any of the previously-described flexible materials of the sheets. The flexible material may have a hydrophobic surface a previously described and may have a surface roughness as previously described. The plurality of tubes may be fixed relative to one another. In one example, a first tube may be fastened to an adjacent second tube, such as by welding, gluing, weaving, or the like. The plurality of inclined tubes may form an angle with the ground of from 10° to 90°, such as from 20° to 80°, from 35° to 70°, from 40° to 60°, from 45° to 65°, or from 45° to 55°.

With continued reference to FIG. 13, the plurality of inclined tubes 80 of the tube clarifier 19 may be tensioned in any number of directions such that the tubular structure of the clarifier 19 is formed, as shown in FIG. 19. The tension may be provided by cables fixed to basin walls or via an external frame.

Figure 14:
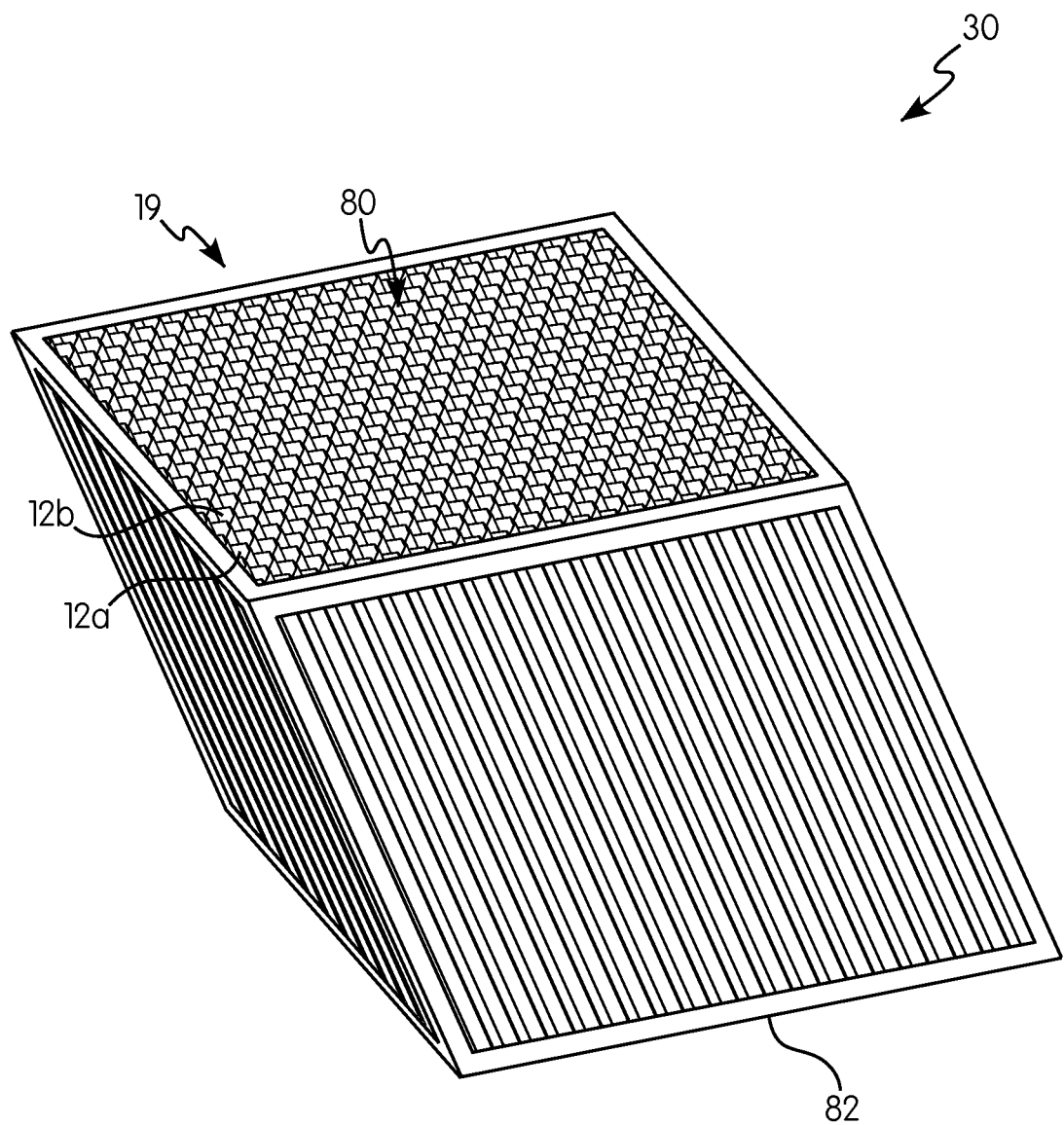
FIG. 14 shows a perspective view the tube clarifier of FIG. 13 supported by a frame.

Referring to FIG. 14, the tube clarifier 19 from FIG. 13 is shown, except in this embodiment, a frame 82 is included to support the clarifier 19. The frame 82 may span the edges of the tube clarifier 19 so as to give the tubular clarifier 19 its structure. Other arrangements for supporting the tube clarifier 19 are within the scope of the invention.

The following examples are presented to exhibit the general principles of the invention. The invention should not be considered as limited to the specific examples presented.

Examples 1-4

Four samples of the materials detailed in Table 1 (polished 316 stainless steel, Comparative Example 1), low density polyethylene (LDPE, Example 2), linear low density polyethylene (LLDPE, Example 3), and polyvinyl chloride (PVC, Example 4)) were attached to an inclined plate with the ability to adjust the angle of inclination.

A 55 gallon Plexiglas tank was constructed, and the inclined plate settlers of Examples 1-4 were placed therein. The angle of inclination of the sheets relative to the ground was varied from 40° to 65°, relative to the ground. Influent from the Allegheny River which was treated with chemistry sufficient to cause flocculation to occur was flowed to the inclined plate settlers.

After testing was completed, visual inspection of the sheets was performed for the amount of floc that accumulated on the sheets. A higher amount of floc accumulating on the sheet indicated a worse performance of the material of the sheet. The sheets for Examples 1-4 were ranked relative to one another for each angle of inclination tested based on this visual inspection. A score of 1 indicated the best performing material, and a score of 4 indicated the worst performing material. The results are shown in Table 1 below, with the "Total Score" column summing the scores of each test at the various angles of inclination.

TABLE 1

| Material | Angle of Inclination (α) | | | | | | Total Score |
|---|---|---|---|---|---|---|---|
| | 65° | 60° | 55° | 50° | 45° | 40° | |
| Comp. Example 1 (Stainless Steel[1]) | 4 | 4 | 4 | 4 | 3 | 3 | 22 |
| Example 2 (LDPE[2]) | 2 | 1 | 1 | 1 | 2 | 1 | 8 |
| Example 3 (LLDPE[3]) | 3 | 3 | 3 | 3 | 4 | 4 | 20 |
| Example 4 (PVC[4]) | 1 | 2 | 2 | 2 | 1 | 2 | 10 |

[1]Polished 316 stainless steel
[2]LDPE Sheet having an average surface roughness (Sa) of ~18 μm
[3]LLDPE Sheet having an average surface roughness (Sa) of ~5 μm
[4]PVC Sheet having an average surface roughness (Sa) of ~7 μm As the Total Score indicates, on the whole, sheets made from the flexible polymeric materials performed better than the comparative stainless steel sheet.

While various embodiments were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A clarifier for water treatment comprising:
a plurality of planar inclined sheets comprising a flexible polymeric material,
wherein each sheet comprises a hydrophobic surface, and
wherein the hydrophobic surface has an average surface roughness (Sa) of from 3 to 100 μm.

2. The clarifier of claim 1, wherein the flexible polymeric material comprises polyester, polyethylene, polypropylene, polytetrafluoroethylene (PTFE), and/or polyvinyl chloride (PVC).

3. The clarifier of claim 1, wherein the flexible polymeric material is a hydrophobic material.

4. The clarifier of claim 1, wherein a surface of the flexible polymeric material is a fabric treated with a hydrophobic material to form the hydrophobic surface.

5. The clarifier of claim 1, further comprising a plurality of vertically-oriented supports, wherein a sheet of the plurality of planar inclined sheets is tensioned between the plurality of vertically-oriented supports.

6. The clarifier of claim 5, wherein a vertically-oriented support of the plurality of vertically-oriented supports comprises an inlet opening configured to allow liquid to flow therethrough.

7. The clarifier of claim 1, wherein the plurality of planar inclined sheets are arranged parallel to one another, and each sheet of the plurality of planar inclined sheets is tensioned between a plurality of vertically-oriented supports.

8. The clarifier of claim 7, wherein vertically-oriented supports tensioning a first sheet of the plurality of planar inclined sheets interlock with adjacent vertically-oriented supports tensioning a second sheet of the plurality of planar inclined sheets.

9. The clarifier of claim 7, wherein the parallel sheets are positioned at an angle relative to the ground of from 10° to 90°.

10. A water treatment system comprising:
a basin; and
the clarifier according to claim 1 positioned in the basin, the clarifier further comprising a plurality of vertically-oriented supports, wherein each sheet of the plurality of planar inclined sheets is tensioned between the plurality of vertically-oriented supports.

11. The water treatment system of claim 10, wherein the flexible polymeric material comprises polyester, polyethylene, polypropylene, polytetrafluoroethylene (PTFE), and/or polyvinyl chloride (PVC).

12. The water treatment system of claim 10, wherein the plurality of planar inclined sheets are arranged parallel to one another.

13. The water treatment system of claim 12, wherein vertically-oriented supports tensioning a first sheet of the plurality of planar inclined sheets interlock with adjacent vertically-oriented supports tensioning a second sheet of the plurality of planar inclined sheets.

14. The water treatment system of claim 12, wherein the parallel sheets are positioned at an angle relative to the ground of from 10° to 90°.

15. The water treatment system of claim 10, further comprising a collection system comprising a collection trough arranged at least partially above the clarifier.

16. The water treatment system of claim 15, wherein the collection system comprises a buoyant member configured to support the collection trough.

17. A method for treating water comprising:
providing the clarifier according to claim 1;
flowing water to the clarifier;
collecting clarified water and/or waste material separated from the water by the clarifier.

18. The method of claim 17, wherein the flexible polymeric material comprises polyester, polyethylene, polypropylene, polytetrafluoroethylene (PTFE), and/or polyvinyl chloride (PVC).

* * * * *